United States Patent [19]
Hanko

[11] Patent Number: 5,828,880
[45] Date of Patent: Oct. 27, 1998

[54] PIPELINE SYSTEM AND METHOD FOR MULTIPROCESSOR APPLICATIONS IN WHICH EACH OF A PLURALITY OF THREADS EXECUTE ALL STEPS OF A PROCESS CHARACTERIZED BY NORMAL AND PARALLEL STEPS ON A RESPECTIVE DATUM

[75] Inventor: James G. Hanko, Redwood City, Calif.

[73] Assignee: Sun Microsystems, Inc., Palo Alto, Calif.

[21] Appl. No.: 499,287

[22] Filed: Jul. 6, 1995

[51] Int. Cl.$^6$ ........................................................ G06F 9/00
[52] U.S. Cl. ...................... 395/676; 395/800.22; 395/390
[58] Field of Search ..................... 395/672, 673, 395/375, 676, 390, 670, 800.16, 800.13

[56] References Cited

U.S. PATENT DOCUMENTS 5,442,758  8/1995  Slingwine ................................ 395/375

OTHER PUBLICATIONS

"The Parallel State Processor", L. Gottlieb & L. Biran Dep. of Math & Comp. Science. Bar Ilan Univ., 1993 IEEE.
A High Speed Data Flow Processing Element and its Performance Compared to a Van Newmann Mainframe, 1993 IEEE.
J.N. Coleman, "On The Performance of A Multi–Thread RISC Architecture", Scott V. Lindsay, 1993 IEEE.
Kleinman, et al., Writing Multithreaded Code in Solaris (Spring 1992) Compcon, San Francisco, CA.
Shaw, The Logical Design of Operating Systems (1974) Computer Science Group, University of Washington, pp. 66–69.
Sun Microsystems, Inc., Multithreaded Programming Guide (1994) PP. 59–62; 76–66; 132.

*Primary Examiner*—Majid A. Banankhan
*Attorney, Agent, or Firm*—Douglas J. Crisman; Flehr Hohbach Test Albritton & Herbert LLP

[57]  ABSTRACT

A pipelined process execution control system for multiprocessors is disclosed that enables multiple processors to cooperatively execute one or many software processes so that cache locality is not violated and extensive state, or context, information need not be saved and restored for each small piece of work performed on multiple data items. The present pipelined process execution control system incorporates (1) a software procedure defined as a pipelined sequence of normal or parallel steps, (2) multiple threads running on the multiprocessor, each of which executes the entire sequence of steps on one datum or data item from a received data stream, and (3) a process control structure to control the threads executing the sequence of steps, so that the normal steps are executed by only one thread at a time and the threads begin executing (or "enter") subsequent normal steps in the sequence in the same order as the threads entered the first step of the sequence. Parallel steps can be executed by more than one thread in parallel. The process control structure provides a process control data structure to track which of the steps is currently being executed by each thread. To eliminate the possibility of simultaneous memory access attempts by the multiple processors hosting the threads, the process control data structure is accessible to only one thread at a time. One specific process control structure disclosed is a mutex combined with a mutex control data structure.

29 Claims, 7 Drawing Sheets

PIPELINE SYSTEM AND METHOD FOR MULTIPROCESSOR APPLICATIONS IN WHICH EACH OF A PLURALITY OF THREADS EXECUTE ALL STEPS OF A PROCESS CHARACTERIZED BY NORMAL AND PARALLEL STEPS ON A RESPECTIVE DATUM

The present invention relates generally to multiprocessors and particularly to control of applications running on multiprocessors.

BACKGROUND OF THE INVENTION

Multiprocessor computer systems contain a multiplicity of processors, each provided with a cache interacting with a single global memory. Software applications written to run on multiprocessor systems are typically broken into constituent processes that can run in parallel on the several processors making up the system. While executing a process, a processor generally reads from and writes to its cache. Occasionally, as it needs data or instructions not present in its cache, the processor must load its cache with data from the global memory. Given the multiplicity of processors, these global memory accesses must be controlled to prevent simultaneous access attempts. Furthermore, as many of the processes are interdependent (e.g, where one process provides data used by another process), the sequence in which the processes update global memory must also be controlled. Typically, these control functions rely on control structures located in global memory that are managed by process control procedures using facilities provided by the multiprocessor computer system's operating system. In the prior art, two such control structures have been described, a "work-pile" model and a "producer-consumer" model.

The producer-consumer model is a software structure that is analogous to an assembly line where each of the several processes or threads (corresponding to workers on the assembly line) performs a small piece of work on the data stream being processed by the application (like one worker installing exhausts and another windshields on incomplete cars moving down the assembly line). For example, a first process might compute the fast Fourier transform (FFT) of an item from a stream of observation data, while a second process concurrently displays, one cycle later, the FFTs computed by the first process. By structuring the processes in this way, the processors are able to simultaneously execute different parts of the application program while cooperating to minimize global data structure access conflicts.

In the "work pile" model, the common software structure is the "work pile" where all work is split into small independent workpieces. Each process or thread takes a workpiece from the work pile, performs the necessary operations on the workpiece, adds the results back to the work pile (if necessary), then repeats the process until, acting together, all of the processes have completed all of the work. As with the consumer-producer model, the work pile allows the threads/processes to cooperatively execute the application on a data stream. However, both of these models generate performance penalties and are not as efficient as they might be due to the inefficient use of the cache associated with each processor.

As mentioned above, each of the processors in a multiprocessor system generally has a data cache to hold the data being operated on. A cache dramatically improves processor performance when the data needed by the processor are commonly available in the cache. When the processor needs data that are not in the cache, a processing delay results due to the need for the processor to write the cache contents back to memory and reload the cache with the memory segment containing the required data. To ensure that the data needed by the processor is commonly available in the cache, and that, therefore, delays are minimized, caches rely on the principle of data reference locality, which is that a program tends to use the same set of data over an extended period of time. Consequently, an efficient cache stores a block of contiguous data. However both of the models mentioned above violate the principle of cache data reference locality. This is because, in each of the models, a processor repeatedly performs a small piece of work on different data items or datums. This results in a processor reloading its cache every time it begins to work on a new datum.

Advances in processor design have lead to a situation where the speed of processors is outstripping the speed of memory by a larger factor each year. When context information must be read from or written to memory often, as in the producer-consumer model, a system can easily reach a point where more time is spent manipulating contexts than in performing useful work.

Moreover, the producer-consumer programming model could be inappropriate when the multiprocessor computer system incorporates hardware accelerators containing a lot of state information, which must be stored every time new data is handed off to a processor.

Consequently there is a need for a process execution control system for multiprocessors that enables multiple processors to cooperatively execute one or many software processes so that cache locality is not violated and extensive state, or context, information need not be saved and restored for each small piece of work performed on multiple data items.

SUMMARY OF THE INVENTION

In summary, the present invention is a process execution control system for multiprocessors that enables multiple processors to cooperatively execute one or many software processes so that cache locality is not violated and extensive state, or context, information need not be saved and restored for each small piece of work performed on multiple data items.

In particular, the present invention is a pipelined process execution control system for a multiprocessor that incorporates (1) a software procedure defined as a pipelined sequence of normal or parallel steps, (2) multiple threads running on the multiprocessor, each of which executes the entire sequence of steps on one datum or data item from a received data stream, and (3) a process control means to control the threads executing the sequence of steps so that the normal steps are executed by only one thread at a time and the threads begin executing (or "enter") subsequent normal steps in the sequence in the same order as the threads entered the first step of the sequence. Thus, the present invention conforms to a "skilled worker" model, where each thread is to a datum as a skilled worker is to a workpiece on which the skilled worker performs all steps of a given manufacturing process. One such example of a skilled worker is a car builder who assembles a single car from beginning to end, high throughput being provided by multiple skilled workers, each building a single car.

In a preferred embodiment of the present invention, the process control means includes a process control data structure to track which of the steps is currently being executed by each thread. To eliminate the possibility of simultaneous memory access attempts by the multiple processors hosting the threads, the process control data structure is accessible to only one thread at a time. Thus, upon completing a step, a first thread with a first priority and access to the control data structure that wants to enter a normal step enters that step only upon verifying from the process control data structure that a second thread with a second priority immediately higher than the first priority has completed that step, upon which the first thread enters the next step and updates the control data structure accordingly to show that it is executing the next step.

In a preferred embodiment of the present invention, the process control means can also include a mutex, or a mutual exclusion mechanism, that regulates access by the threads to the process control data structure. The mutex is accessible to all of the threads but obtainable by only one thread at a time according to a cooperative scheme that ensures that each thread will eventually obtain the mutex. Only upon obtaining the mutex may a thread access the process control data structure for reading or writing.

Finally, the process control data structure of the present invention can further include a process list consisting of multiple thread status records, each of which represents the last step finished, last step started, and the next step to be entered by one thread, ordered according to the relative priorities of the threads and a pipeline element consisting of a head pointer to the thread status record with the highest priority, and the mutex.

This control structure guarantees that results exit the pipelined process in exactly the same order as the data items to be processed entered the first step of the process. Moreover, because each thread operates on a single datum from the first to last step of a process, cache locality is preserved, and state or context information required by each thread running on a processor does not need to be frequently regenerated.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENT

Figure 1:
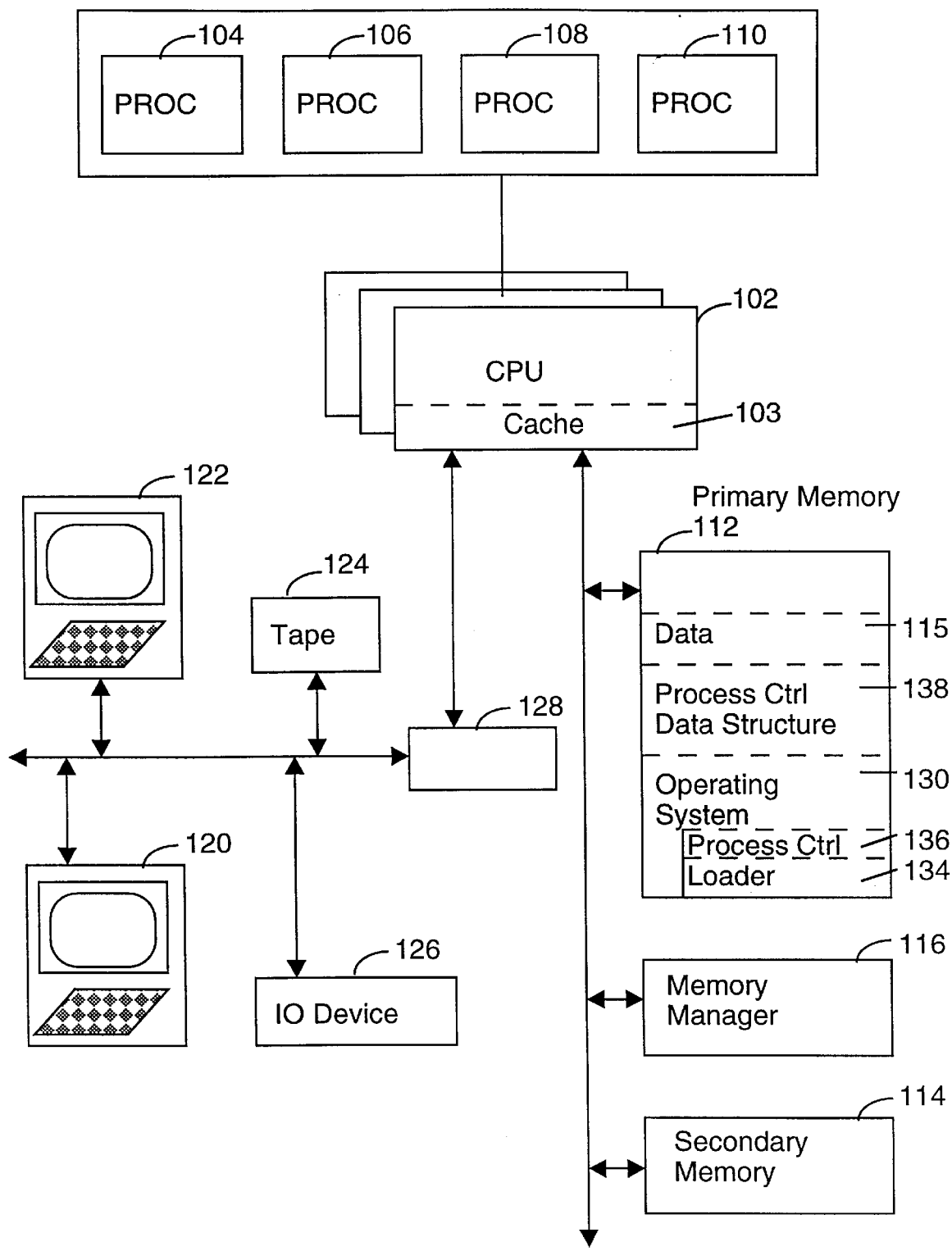
FIG. 1 is a block diagram of a multiprocessor computer with a multitasking operating system.

FIG. 1 shows a multiprocessor computer system 100 in accordance with the present invention that includes multiple central processing units ("processors") 102 on which several processes 104–110 are run concurrently. Each of the processors 102 is configured with a fast cache memory 103 to hold data and instructions. Each process has its own virtual memory space that is mapped partially into high speed primary memory 112 and partially into lower speed secondary memory 114 by a virtual memory manager 116. More generally, each process 104–110 is allocated a certain portion of the computer's resources, including selected peripheral devices such as terminals 120–122 and other input/output devices 124 and 126, all of which are accessed via an input/output device controller 128. Other types of resources that are allocated to selected ones of the processes 104–110 include specified sets of data and data structures, including a process control data structure 138, provided in the system's memories 112, 114.

The operating system 130 is a set of software that controls the computer system's operation and allocates resources to the processes 104–110. For the purposes of the present document, it can be assumed that the operating system 130 is stored in the primary memory 112, although certain infrequently used portions of the operating system may be swapped out to secondary memory by the memory manager 116. The operating system includes key procedures of the present invention such as a process control routine 136, which controls and coordinates the processes 104–110 running on the multiprocessor system 100 through the management of a thread loader 134, also provided by the operating system 130, and the process control data structures 138 provided in the system's memories 112, 114. These three elements, the process control routine 136, the loader 134 and the control data structure 138, together make up a preferred embodiment of the pipelined process execution control system (PPECS) 132 of the present invention, which is described below in reference to FIG. 3.

Process Diagrams

For the purpose of the present invention, a process is defined as a pipelined sequence of normal and parallel steps, where each step represents a discrete unit of work performed by a thread (or a "skilled worker") on an item of data or datum from a received data stream. This concept is similar to the notion of a step from the producer-consumer or work-pile models; however, the present invention adopts a process execution control model wherein the sequence of steps defining a process is executed from beginning to end by one thread on a single datum or data item from a received data stream. With reference to the assembly line metaphor, this is like one "skilled worker" building a car from scratch, concurrency in the system being provided by multiple "skilled workers" each simultaneously working on a respective car.

Figure 2A:
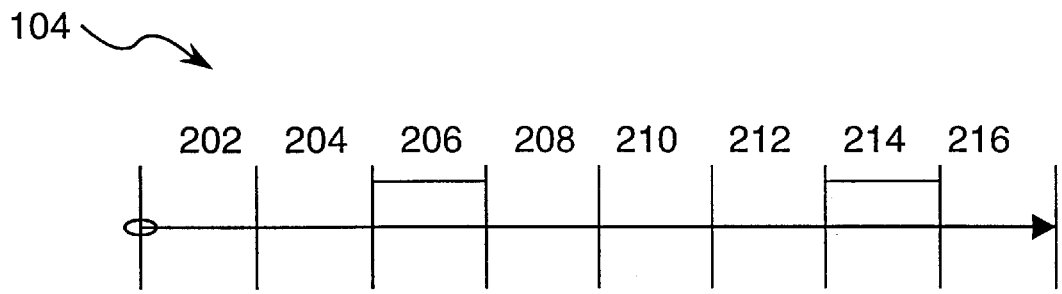
FIG. 2A is an illustration of the steps composing a first process.
Figure 2B:
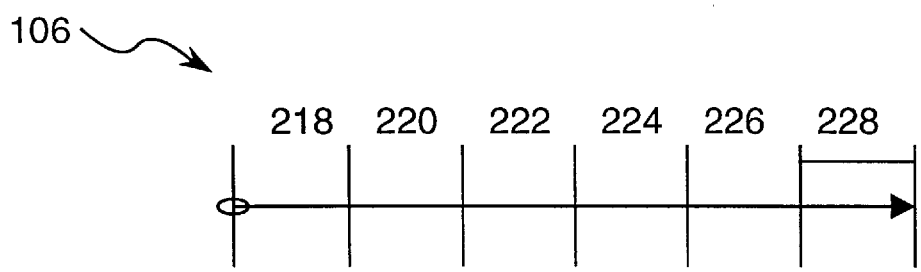
FIG. 2B is an illustration of the steps composing a second process.
Figure 6:
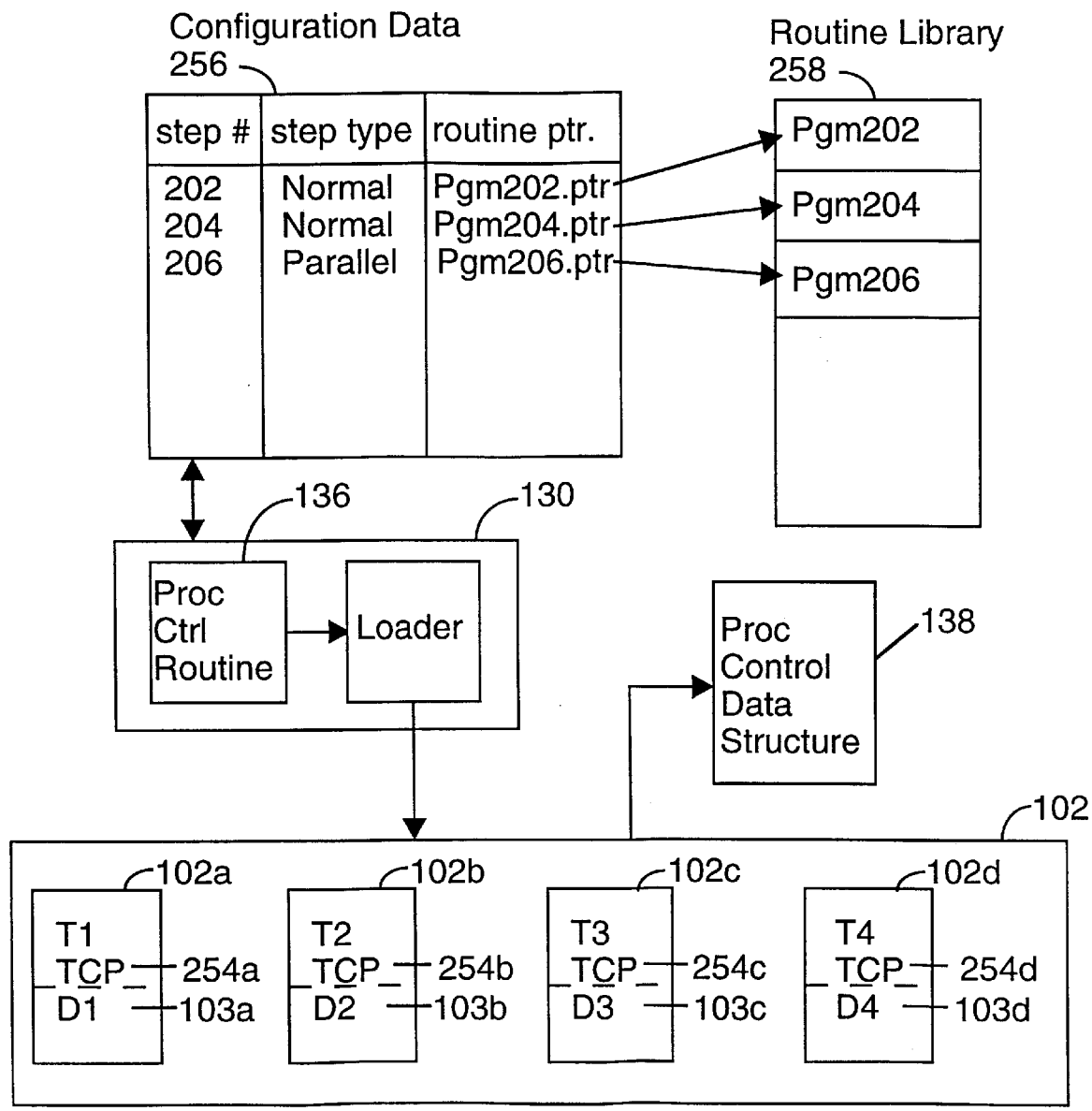
FIG. 6 is a block diagram of an alternative embodiment of the data structures from FIG. 3 including an additional configuration data table and routine library.

Referring to FIGS. 2A and 2B, respectively, two such processes 104 and 106 are illustrated via timelines where the earlier steps in a process are shown on the left of the timeline, the vertical lines mark step boundaries, the beginning of the first step in a process is marked with a circle and the last step with an arrow. Thus, process 104 consists of steps 202–216 and process 106 of steps 218–228, which are executed in that order. Some of these steps are characterized as normal steps, indicated on these figures with a single horizontal line; e.g., steps 202, 204 and 226. All other steps are characterized as parallel steps, which are indicated with hollow rectangular boxes; e.g, steps 206 and 228. While a detailed description of normal and parallel steps is provided below, briefly, normal steps are steps that can only be executed by one thread at time, whereas parallel steps can be executed simultaneously by several threads. For example, rendering to one of the terminal displays 120 might be characterized as a normal step, whereas computing a FFT would likely be a parallel step. In a first preferred embodiment of the present invention, these step characteristics; i.e., whether the step is normal or parallel, are hard-coded in the program statements defining a particular process. A more general, table-driven characterization scheme is shown in FIG. 6, which is discussed below.

Pipeline Process Execution Control System (PPECS)

Figure 3:
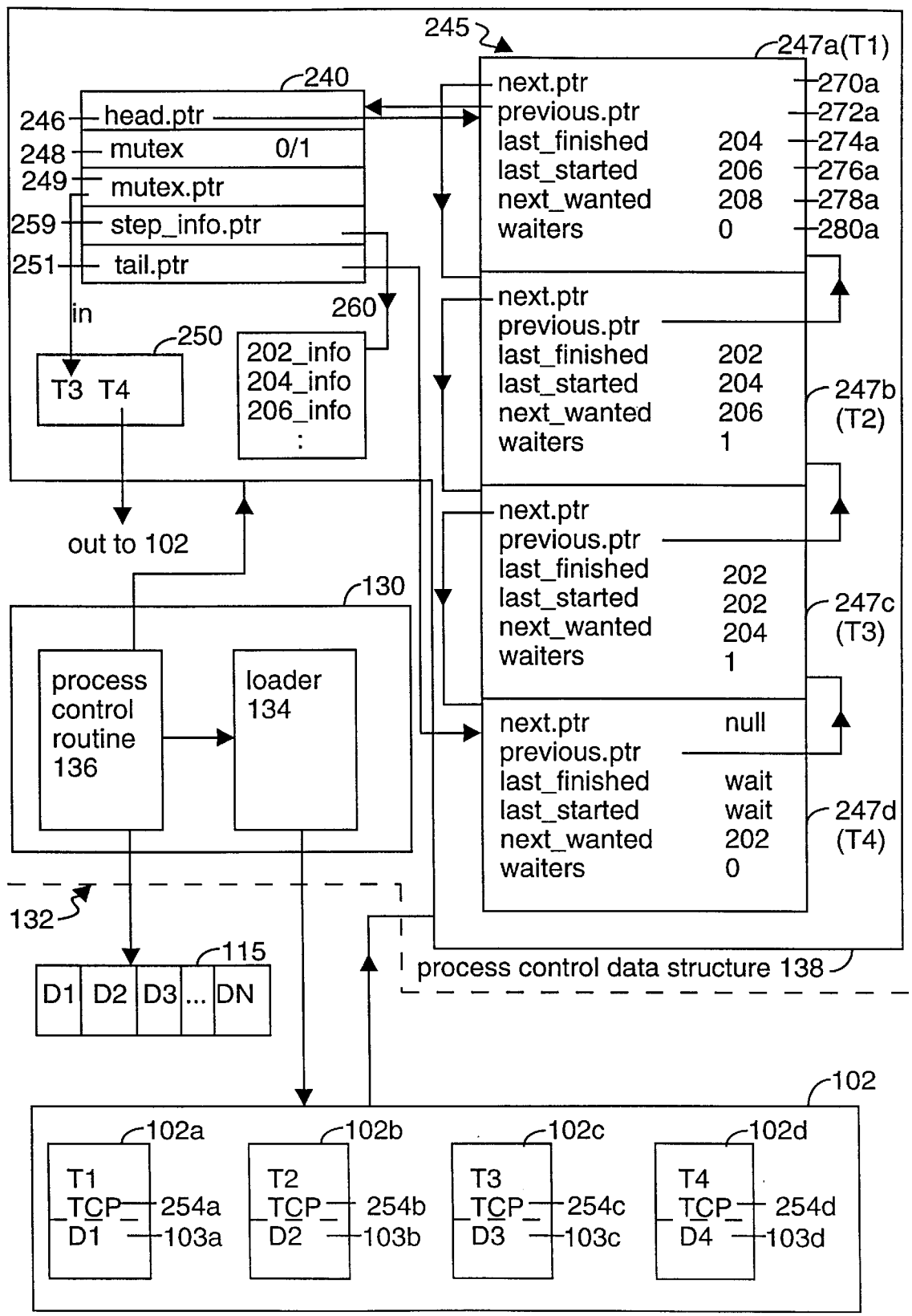
FIG. 3 is a block diagram of the data structures used by the pipelined process execution control system of the present invention.

Referring to FIG. 3, there is shown above the dashed line a block diagram of the PPECS 132, which includes the process control routine 136, the thread loader 134 and the process control data structure 138. Also shown on FIG. 3 are block diagrams of the four processors 102a–102d making up the processor 102 and the data memory 115, which stores input data used and results generated by the processes 104–110. Each processor 102 interacts with the process control data structure 138, the process control routine 136, the thread loader 134, the data memory 115 and other processors 102.

Process Control Data Structure

The process control data structure includes, for each process 104–110 being executed, a process list 240, a thread status list 245 of thread status records 247, a mutex control data structure 250 and a step information data structure 260. The process list 240 summarizes top-level process data for each process, including the status of the mutex 248 (i.e., locked/1 or unlocked/0), a mutex pointer 249 to the mutex control data structure 250, a head pointer 246 to the head of the thread status list 245, which is the same as the thread status record 247 corresponding to the highest priority thread running the corresponding process, a step information pointer 259 to the step information data structure 260, which stores detailed statistical information about each of the steps of the corresponding process, and a tail pointer 251 to the end of the thread status list so that thread status records for new threads can be added easily to the end of the thread status list.

The process list 240 is the only means by which the process control routine 136 or the processors 102 hosting the threads can access information stored in the process control data structure 138. Access to the thread status list 245 of the process control data structure 138 is limited to only the one thread in possession of the mutex 248. The mutex control data structure 250, described below, ensures that the processors hosting the threads executing the steps of the same process can obtain the mutex 248 in a cooperative fashion.

A thread status record 247 contains several fields summarizing the current state of one of the threads executing a process, including the last step finished ("last_finished") by the thread 274, the last step started ("last started") by the thread 276, the next step ("next_wanted") the thread wants to enter or begin executing 248 and the number of other threads executing the same process waiting to enter the state ("waiters") 280 presently occupied by the one thread. Each thread status record 247 also contains a pointer to the thread status entry 247 corresponding to the next lower priority thread ("next.ptr") 270 and a pointer to the next higher priority thread executing the same process ("previous.ptr") 272. The previous pointer 272a of the highest priority thread status entry 247 can be set to null or can address the process list 240. As intimated above, the thread status record 247 are ordered by thread priority, where thread priority, in the preferred embodiment, is a function of the time a thread began executing the process, the first thread in time having the highest priority, the corresponding thread status record 247 thus being addressed by the head pointer 246 of the process list 240.

For example, the thread status record 247a of FIG. 3 shows that a thread T1 running the process 104 last finished step 204, last started step 206 and wants next to execute step 208. Similarly, the thread status record 247b shows that a thread T2, also running process 104, last finished step 202, last started step 204 and wants next to enter step 206. Note that the thread T1 has higher priority than the thread T2 as the thread T1 entered the first step 202 of the process 104 before the thread T2 did. As a result, the thread status record 247a, corresponding to the thread T1, is at the head of the thread status list 245 and is addressed by the head pointer 246.

Note that in FIG. 3, the threads T1–T4 are shown being hosted on the processors 102a–102d, respectively; however, in general each of the processors 102 could host one or more of the threads executing the steps of a process. Additionally, each of the processors contain a common thread control program (TCP) 254, which acts as the processor's executive program, and a data cache 103 loaded with a data item or datum D1–D4, possibly input data from the data memory 115 or process results generated by a thread. The processors 102 communicate with the process control data structure 138, the loader 134 and each of the other processors 102. By cooperatively accessing and updating the process control data structure 138, the processors 102 are able to run the threads in a coordinated fashion that ensures that the threads execute to completion in correct order and that the integrity of global data structures, including the process control data structure 138 and the data memory 115, is maintained.

Process Control Routine

The process control routine 136 is the operating system procedure that performs the global control functions and manages the global data structures (i.e., the process control data structure 138) that together ensure the effective cooperation of the multiple processors 102 running the processes 104–110. The first task of the process control routine 136 is to allocate the available processors 102 among the processes 104–110 being executed on the multiprocessor system 100. As is well known in the prior art, dividing work among multiple processors depends on the number and system-resource demands of the processes to be executed. For example, assuming that the two processes 104 and 106, shown in FIG. 2, are to be executed concurrently, the process control routine might ideally allocate 8 and 6 processors to process 104 and 106, respectively, thereby allowing each process to be executed with maximum concurrency. Of course, in the real world, the division of resources among the processes 104 and 106 would probably be constrained due the availability of a less than ideal number of processors. Therefore, for the purpose of this discussion, it is assumed that only four processors 102a–102d are available to the process control routine, 136, and that all of those processors were assigned by the process control routine 136 to execute the process 104, as is shown in FIG. 3.

Having assigned the processors 102 to the processes 104–110, the process control routine 136 next must determine how many threads should execute each process (i.e., in this case, the one process 104). Generally, the optimal number of threads executing a process is identical to number of processors allocated to the process. For example, even though the process 104 has eight steps 202–216, as there are only four available processors 102a–102d, the process control routine 136 would spawn only four threads to execute the process 104. However, if the process control routine 136 required, for some reason, that a thread spend some time in the operating system kernel, therefore not running at all times on one of the processors 102a–102d, the optimal number of threads might exceed the number of processors 102. In another situation, where some of the processors 102 are unusually fast or slow relative the others, multiple threads might be assigned by the process control routine 136 to run on a single processor. Moreover, the process control routine 136 might swap a thread from one processor to another at any time during the execution of the processes 104–110.

In an alternative embodiment of the present invention, these first two steps, allocating processors to processes and determining the optimal number of threads to execute the steps of a process, could be carried out dynamically. I.e., the process control routine 136 could constantly monitor the status of each process 104–110 and reallocate newly available processors from the multiple processors 102 to new or currently executing processes, and, accordingly, add new threads to run the process on the newly available processors.

Next, based on the number of threads executing each pipelined process, the process control routine 136 allocates space from the primary memory 112 for the process control data structure 138, described above. For example, assuming that process control routine 136 spawned four threads T1–T4 to run the process 104 on the four processors 102a–102d, respectively, the process control data structure 138 will include four thread status records 247a–247d, the first of which, corresponding to the thread T1, is addressed by the head pointer 246 of the process list 240, the remaining thread status records 247b–247d being linked in that priority order. For the purposes of this application, thread priority corresponds to the time order in which the threads began executing the first normal step of the corresponding process. Thus, thread T1 has the highest priority because it began executing step 202 before T2, which in turn began executing step 202 before threads T3 and T4.

Still referring to FIG. 3, the process control routine 136 allocates one mutex 248 and a mutex control data structure 250 for each process running in the multiprocessor system 100. The mutex 248 acts as a key to allow the various threads 102a–102d to cooperatively access and update the process control data structure 138. That is, to read from and write to the global process control data structure 138, a thread must have possession of the mutex 248. Any of the threads may possess the mutex 248, but only one thread may do so at a time. Consequently, the mutex ensures that the multiple threads running on the various processors 102a–102d do not simultaneously attempt to access global data structures, either the data memory 115 or the thread status list 245. Of course, if some of the threads attempt to obtain the mutex 248 while the mutex is locked by virtue of being in the possession of another thread, a scheme must be provided to ensure that the locked out threads will eventually be able to obtain the mutex. As mutex control of global data structures in multiprocessors is well known, there are many prior art techniques for ensuring this cooperative access to the mutex 248. One technique, illustrated in FIG. 3, shows a mutex control data structure 250 that consists of a simple FIFO queue wherein the earliest mutex requesting thread gets possession of the mutex 248 when the mutex is released or unlocked by the thread in previous possession of the mutex. For example, FIG. 3 shows that the thread T4 is next in line for the mutex 248, while the thread T3 is queued up behind the thread T4.

Once the process control routine 136 has allocated the global data structures discussed above, it calls the loader 134, which then loads the program instructions associated with the process 104 into the processors 102a–102d, respectively associated with the threads T1–T4, and loads data items D1–D4 into the data caches 103a–103d associated with the processors 102a–102d. Alternatively, the loader 134 might dynamically load a processor 102 with a new thread only when a new datum becomes available, loading threads for each new datum until the predetermined number of threads is reached. Also loaded into each of the processors 102a–102d is the thread control procedure 254, which takes control of its hosting processor 102a–102d and begins executing as soon as the processor has been initialized as set out above. Once it beings executing, the thread control procedure 136 takes control of the processor until the thread hosted on that processor has run to completion. Once the thread has completed, the thread control program 254 passes control of the now idle processor 102 that hosted the thread back to the process control routine 136, which then allocates a new thread (probably running the same process) and a new data item from the data memory 115 to that processor, updates the process control data structure 138, and calls the loader, which once again loads the processor with the new data and program steps, if necessary, after which, the processor once again begins to execute the hosted process on the new data item under control of the thread control procedure 136. Thus, the processors 102 are allowed to run as independently as possible, control over the processors being passed to the process control routine 136 only when each processor 102a–102d has finished running its hosted thread.

Thread Control Procedure

Figure 4:
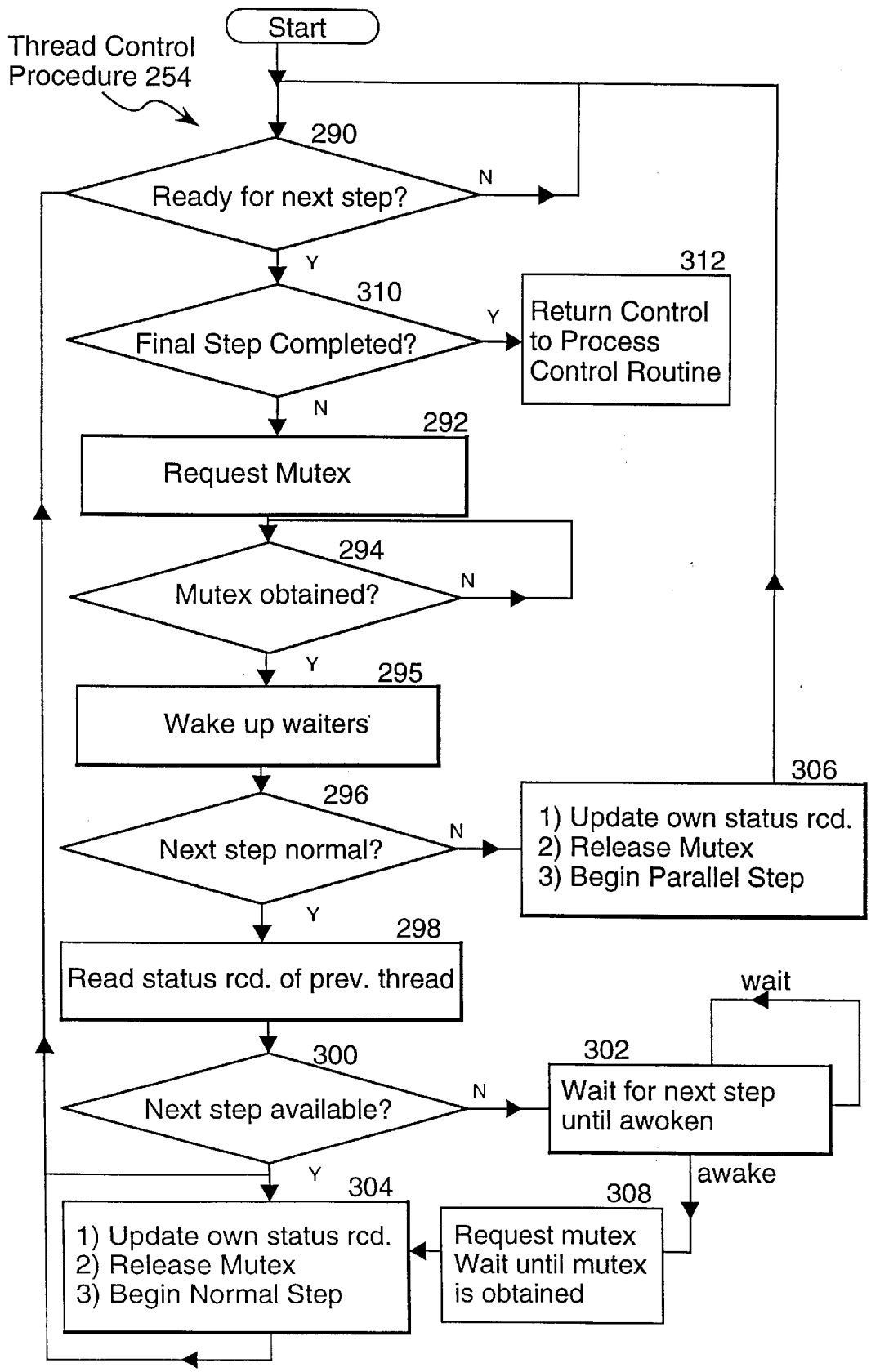
FIG. 4 is a flowchart of the thread control procedure running in each processor of the present invention.

Referring to FIG. 4, there is shown a flowchart illustrating the generic thread control procedure (TCP) 254 of the present invention. To provide context for the following discussion, the steps of the TCP are described in reference to various representative TCPs 254a–254d, running on the processors 102a–102d. Please note that all of the TCPs of the present invention are functionally identical, regardless of the thread or process with which they are associated. Various steps of the TCP 254 are illustrated by reference to the process control data structure 138 shown in FIG. 3.

The first step of the TCP 254 is to determine whether its thread (meaning the thread whose execution of the process steps is under a particular TCP's control) is ready to run the next step of the process 104 (290). This condition is met when the thread is waiting to enter the pipe (i.e., begin executing the steps of the pipelined process) or when the thread has finished the step previously started. When this condition is met (290-Y), the thread updates the corresponding thread status entry accordingly, but only upon obtaining the mutex 248 (292). For example, referring to FIG. 3, when the thread T3 finishes the step 202, after obtaining the mutex 248, the TCP 254c sets the last_finished field 274c of thread T3's thread status record 247c equal to "202", which is the same as the last_started field 276c, and sets the next_wanted field 278c to "204", which is the next step in the process 104 being executed by the thread T3.

If the TCP 254 is unable to obtain the mutex (294-N), the mutex request made by the TCP is placed in a FIFO queue (or some other control structure), represented by the mutex control data structure 250 in FIG. 3, which is accessible to the processors 102 and ensures that mutex requests are handled cooperatively so that each of the TCPs 254 eventually obtains the mutex. Once the TCP obtains the mutex (294-Y), it updates the process control data structure 138 as outlined above and wakes up threads (295) waiting to begin executing the step just completed by its thread. The TCP must also determine whether its thread can enter or begin executing the next process step.

If the next step is characterized as a normal step (296-Y), meaning that only one thread may execute the step at a time, the TCP 254 accesses the thread status record 247 corresponding to the thread with a priority immediately higher than that of the hosted thread to determine whether the higher priority thread is presently executing the next step (298). For example, before the thread T3 can enter step 204 from step 202, the TCP 254c associated with the thread T3 must first access the thread status record 247b through previous.ptr 272c (i.e., the pointer to the previous thread status record), to determine whether the corresponding last_finished field 276b (i.e., the last step started by thread T2) is greater than or equal to "204", indicating that step 204 can be entered by thread T3. As the TCP in possession of the mutex 248 is the only TCP able to access this information, and given that the threads are strictly ordered in the process list 240, the TCP 254c in this example needs to check only the status of the next higher priority thread, thread T3.

If the next step, being a normal step, is not available (300-N), the TCP 254 enters a wait state 302 after incrementing the waiters field 280 of the previous or higher priority thread status record 247. For example, referring to the process control data structure shown in FIG. 3, because thread T3 is blocked from entering step 204 (i.e., the last_finished field of thread status record 247b is less than the next_wanted field of thread status record 278c), the TCP 254c increments T2's waiters field 280b from "0" to "1", showing that thread T3 is waiting to enter the step 204. When thread T2 completes step 204, as was discussed above, the TCP 254b broadcasts to all of the waiters that step 204 is now free; upon which the waiters wake up. The TCP 254c then requests the mutex, waits until the mutex is obtained (308), and then causes thread T3 to begin executing step 204.

If the next step is available (300-Y), the TCP updates its own thread's status record (i.e., it shows that the thread has entered the next process step in the pipe), releases the mutex 248, and begins executing the next normal step (304). For example, once the thread T3 has entered the step 204, this updating involves the TCP 254c changing the last_started field 274c from "202" to "204".

When that step is completed, the TCP once again enters the ready wait state (290). When all of the steps have been executed (310), the TCP returns control to the process control routine 136 (312), which can retrieve results from the cache memory 103, or primary or secondary memory 114 or 116.

If the next step is not normal, meaning that it is parallel (296-N), the TCP updates its thread status record 247a, releases the mutex 248, and begins the parallel step. Of course, because the step being entered is parallel, that step could be concurrently executed by any number of the threads T1–T4. As a result, it is not necessary for a TCP to reference the process control data structure 138 in the manner described above to determine whether the step is available. For example, FIG. 3 shows from the thread status record 247a that the thread T1 is presently executing step 206 but that it has not completed step 206. Normally, as outlined above, this status would prevent the thread T2 from beginning to execute the step 206 (which is the next wanted step 278a of the thread T2). However, as shown in FIG. 2A, the step 206 is parallel; consequently, the TCP 254b, merely changes the last_started field 276b to "206" and releases the mutex 248. Immediately thereafter, the thread T2 begins to execute step 206 in parallel with the thread T1.

Process Illustrations

As a result of the initial ordering of the threads T1–T4, the memory access discipline imposed by the mutex and the logic of the thread control procedure, certain desirable data flow properties can be imposed by appropriately characterizing the steps. For the following discussion, the received data stream being processed is understood to comprise several data items or datums Dn, . . . D4, D3, D2, and D1, from the data memory 115, datum D1 being the first item to be processed by one of the threads of the present invention.

As was described above, the present invention provides two fundamental rules governing the ordering of outputs generated by the threads concurrently executing the steps of a process. First, a thread must enter and exit a normal step in exactly the same order as the threads initially entered the pipelined process being executed by the threads. Second, if the last step of a pipelined process is parallel, then threads may exit that step in any order. This is because, if the last step is characterized as parallel, it must have been the case that exiting order was not a concern of the application programmer; rather, this indicates that the programmer's concern was probably speed of execution.

These rules, which are embodied in the logic of the TCP 254, described above in reference to FIG. 4, are illustrated in FIGS. 5A–5G, which show snapshots of the processes 104 and 106 as they are being cooperatively executed by the threads T1–T4.

Figure 5A:
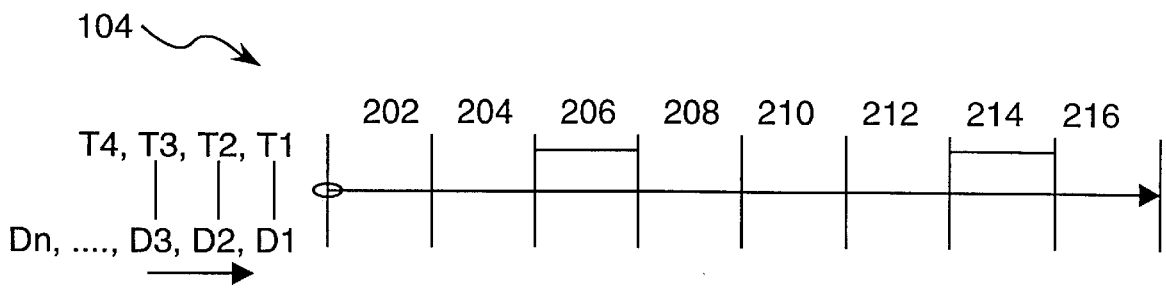
FIG. 5A is a timeline showing the initial state of the first process.

In FIG. 5A, the process control routine has spawned four threads T1–T4 to execute the pipelined steps of process 104 on the data items D1–D4, respectively, from the received data stream. At this point, each of the threads is waiting to enter the pipeline, and the threads T1–T4 have been ordered (which is reflected in the process list 240) so that thread T1 will be the first thread to enter the pipelined process 104, and T4 the last.

Figure 5B:
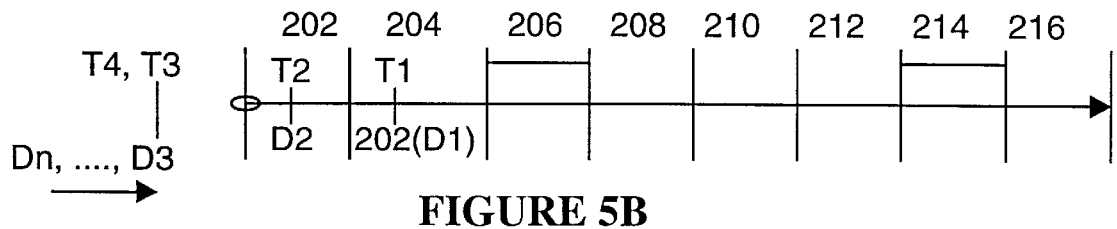
FIG. 5B is a timeline showing the state of the first process after two threads T1 and T2 have begun executing the steps of the process.

In FIG. 5B, thread T1 has executed step 202 on the datum D1, generating a partial result 202(D1), and is in the process of executing step 204 on those results. Thread T2 has just entered the pipeline and is beginning to execute step 202 on the datum D2. Threads T3 and T4 are still waiting to enter the pipeline in that order.

Figure 5C:
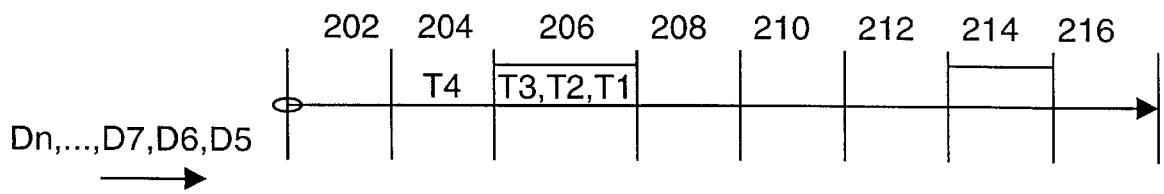
FIG. 5C is a timeline showing the state of the first process while three threads T1, T2 and T3 are simultaneously executing a parallel step.

In FIG. 5C, the threads T1, T2 and T3 are shown simultaneously executing the parallel step 206 on their respective transformed datums, 204(D1)–204(D3), respectively. The steps preceding step 206 are all normal, thus are executable by only one thread at a time. As step 206 is parallel, it is executable by multiple threads. However, because step 206 is followed by the normal step 208, the threads T1–T3 will be constrained by the thread control procedures 254a–254d to leave step 206 in the same order in which they entered it.

Figure 5D:
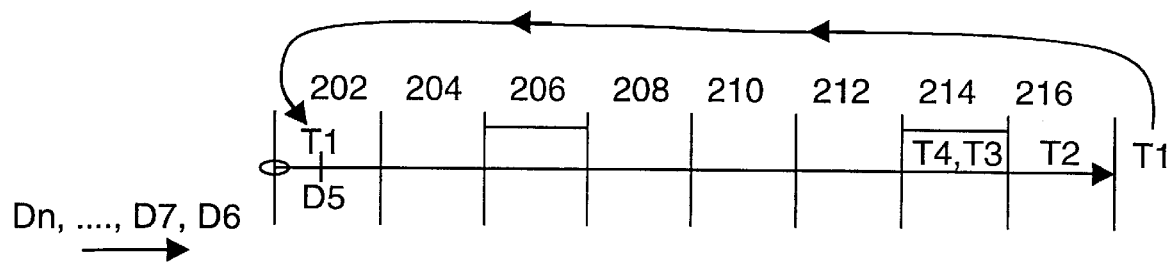
FIG. 5D is a timeline showing the state of the first process after thread T1 has completed the process.

In FIG. 5D, thread T2 has just exited the parallel step 214, which it was executing in parallel with the two threads T3 and T4. As set out above, even if thread T2 was not the first to complete step 214, being the highest priority thread of the three threads, thread T2 must be the first thread to exit the parallel step 214. Consequently, thread T2 is shown executing the last normal step of the pipelined process 104, while threads T3 and T4 are shown in the parallel step 214, which they may have already completed. Thread T1, having previously executed the last step 216 on the transformed datum 214(D1), has been reassigned by the process control routine 136 to begin executing the process 104 from the first step 202 on another datum D5.

Figure 5E:
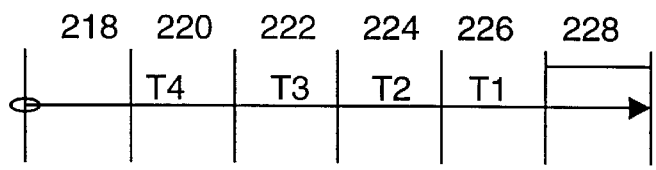
FIG. 5E is a timeline showing the state of the first four threads T1–T4 executing in the second process where all four threads are executing different normal steps of the process.
Figure 5F:
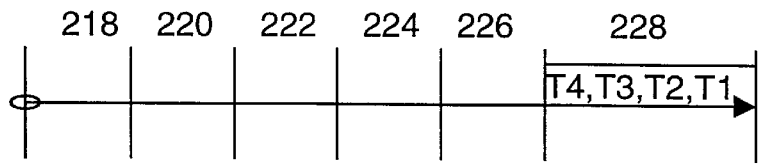
FIG. 5F is a timeline showing the state of the second process where four threads T1, T2, T3 and T4 are simultaneously executing the last step of the process, which is a parallel step.
Figure 5G:
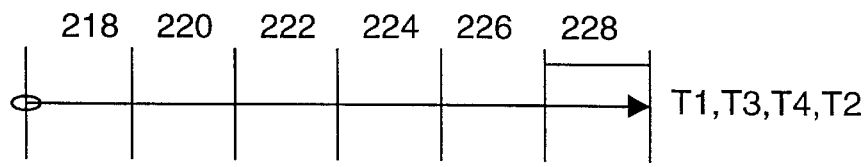
FIG. 5G is a timeline showing the order of the four threads T1–T4 executing in the second process after all of the threads have executed the last parallel step of the process.

FIGS. 5E–5G show snapshots of the pipeline process 106, with a last parallel step 228, being executed by the threads T1–T4. In FIG. 5E, the threads T1–T4 are lined up in priority order, respectively executing steps 226–220 on transformed data items 224(D1), 222(D2), 220(D3) and 218(D4). In FIG. 5F, each of the threads is executing the parallel step 228. In FIG. 5G, the threads T2, T4, T3, T1 have exited the pipeline, in that order, after completing the last step 228. Because step 228 is parallel and a last step, the threads are not constrained to exit the step in the same order as they entered the step.

Alternative Embodiments

FIG. 6 shows an alternative characterization scheme, which utilizes a characterization table 256 and a routine library 258. In this second scheme, the characterization table 256 provides one record characterizing each step of the processes 104–110. Each record contains a step identifier, a step type and a pointer to the entry in the routine library 258 storing the program for executing the step. For example, the configuration data table 256 shows that process 104 includes a normal step 202 corresponding to the program PGM202 to be found in the routine library 258 entry addressed by the pointer PGM202.ptr. This implementation frees the programmer from hard coding process step characteristics. The configuration table 256 is accessible to process control routine 136, which can use the information contained therein to allocate processors and threads to the process so described and to load the various processors 102 with thread programs.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A pipeline method for executing a process on a multiprocessor computer system having a plurality of processors and a memory, wherein said process includes a plurality of steps, each of said steps being classified as a normal step or a parallel step, said method comprising the steps of:

receiving a data stream including a plurality of datums;

executing a plurality of threads on said plurality of processors, each of said threads executing all of said plurality of steps on a respective one of said datums;

said executing step including executing each of said normal steps by at most one of said threads at a time;

said executing step further including executing each of said parallel steps by any number of said threads at a time;

said executing step including constraining said threads to execute said normal steps in the same order that said threads begin execution of said process on successively received ones of said datums.

2. The pipeline method of claim 1, wherein each of said steps is classified as said normal step or said parallel step by a classifier that analyzes said procedure.

3. The pipeline method of claim 1, wherein each of said steps is classified as said normal step or said parallel step based on classification data stored in said memory, said classification data being indexed to said steps of said procedure.

4. The pipeline method of claim 1, wherein said executing step is controlled by a process controller, said process controller comprising a process control data structure in said memory to track which of said steps is currently being executed by each of said threads, said process control data structure being accessible to only one of said threads at a time; such that on completing a said step, a first thread with a first priority and access to said data structure begins executing a next normal step only upon verifying from said process control data structure that a second thread with a second priority immediately higher than said first priority has completed said next normal step.

5. The pipeline method of claim 4, wherein said process controller further comprises a mutex in said memory accessible to all of said threads but obtainable by only one of said threads at a time according to a cooperative scheme that ensures that each of said threads will eventually obtain said mutex, wherein said threads may read to or write from said data structure only after obtaining said mutex.

6. The pipeline method of claim 5, wherein said process control data structure further comprises a process list in said memory including a list header that addresses a linked list of thread status records, each of said thread status records uniquely representing thread status of a respective one of said threads running said sequence of steps, including which of said steps is currently being executed by said corresponding thread, said process list having a process list structure representing relative priorities of said threads.

7. The pipeline method of claim 6, wherein said process control data structure further comprises a thread status data structure in said memory of ordered thread status records, each of said thread status records uniquely representing thread status of one of said threads running said sequence of steps, including which of said steps is currently being executed by said corresponding thread.

8. The pipeline method of claim 1, wherein there is a one-to-one correspondence between said threads and said processors on which said threads are executing.

9. The pipeline method of claim 1, wherein some of said threads are executing on more than one of said processors.

10. In a microprocessor having a plurality of processors and a memory, a pipelined, process execution control system that controls execution of a procedure having a sequence of steps for processing a received data stream having a plurality of datums, each of said steps being classified as one of a normal step or a parallel step, said process execution control system comprising:

a thread loader that loads said plurality of processors with a plurality of threads, each of said threads executing all of said steps of said procedure on a respective one of said datums; and a thread controller that coordinates said threads executing said procedure so that said threads execute said normal steps in the same order that said threads execute the first step of said sequence of steps and no more than one of said threads executes one of said single steps at a time.

11. The pipelined process execution control system of claim 10, further comprising:

a classifier for classifying each of said steps as one of said normal step or said parallel step.

12. The pipelined process execution control system of claim 10, further comprising:

classification data stored in said memory for classifying each of said steps as one of said normal step or said parallel step, said classification data being indexed to said steps of said procedure.

13. The pipelined, process execution control system of claim 10, wherein said thread controller comprises a process control data structure to track which of said steps is currently being executed by each of said threads, said process control data structure being accessible to only one of said threads at a time; wherein, on completing a said step, a first thread with a first priority and access to said data structure begins executing a next normal step only upon verifying from said process control data structure that a second thread with a second priority immediately higher than said first priority has completed said next normal step.

14. The pipelined, process execution control system of claim 13, wherein said process controller further comprises a mutex in said memory accessible to all of said threads but obtainable by only one of said threads at a time according to a cooperative scheme that ensures that each of said threads will eventually obtain said mutex, wherein said threads may read to or write from said data structure only after obtaining said mutex.

15. The pipelined, process execution control system of claim 14, wherein said process control data structure further comprises a process list in said memory including a list header that addresses a linked list of thread status records, each of said thread status records uniquely representing thread status of one of said threads running said sequence of steps, including which of said steps is currently being executed by said corresponding thread, said process list having a process list structure representing relative priorities of said threads.

16. The pipelined, process execution control system of claim 15, wherein said process control data structure further comprises a thread status data structure of ordered thread status records, each of said thread status records uniquely representing thread status of one of said threads running said sequence of steps, including which of said steps is currently being executed by said corresponding thread.

17. The pipelined, process execution control system of claim 10, wherein said process controller allocates said threads among said processors.

18. The pipelined, process execution control system of claim 17, wherein said process controller allocates each of said threads to one of said processors.

19. The pipelined, process execution control system of claim 18, wherein said process controller allocates some of said threads to more than one of said processors.

20. A computer-readable memory that can be used to direct a microprocessor having a plurality of processors to control execution of a procedure having a sequence of steps for processing a received data stream having a plurality of datums, each of said steps being classified as one of a normal step or a parallel step, said computer-readable memory comprising:

a thread loader that loads said plurality of processors with a plurality of threads, each of said threads executing all of said steps of said procedure on a respective one of said datums; and a thread controller that coordinates said threads executing said procedure so that said threads execute said normal steps in the same order that said threads execute the first step of said sequence of steps and no more than one of said threads executes one of said single steps at a time.

21. The computer-readable memory of claim 20, further comprising:

a classifier for classifying each of said steps as one of said normal step or said parallel step.

22. The computer-readable memory of claim 20, further comprising:

classification data stored in said memory for classifying each of said steps as one of said normal step or said parallel step, said classification data being indexed to said steps of said procedure.

23. The computer-readable memory of claim 20, wherein said thread controller comprises a process control data structure to track which of said steps is currently being executed by each of said threads, said process control data structure being accessible to only one of said threads at a time; wherein, on completing a said step, a first thread with a first priority and access to said data structure begins executing a next normal step only upon verifying from said process control data structure that a second thread with a second priority immediately higher than said first priority has completed said next normal step.

24. The computer-readable memory of claim 23, wherein said process controller further comprises a mutex in said memory accessible to all of said threads but obtainable by only one of said threads at a time according to a cooperative scheme that ensures that each of said threads will eventually obtain said mutex, wherein said threads may read to or write from said data structure only after obtaining said mutex.

25. The computer-readable memory of claim 24, wherein said process control data structure further comprises a process list in said memory including a list header that addresses a linked list of thread status records, each of said thread status records uniquely representing thread status of one of said threads running said sequence of steps, including which of said steps is currently being executed by said corresponding thread, said process list having a process list structure representing relative priorities of said threads.

26. The computer-readable memory of claim 25, wherein said process control data structure further comprises a thread status data structure of ordered thread status records, each of said thread status records uniquely representing thread status of one of said threads running said sequence of steps, including which of said steps is currently being executed by said corresponding thread.

27. The computer-readable memory of claim 20, wherein said process controller allocates said threads among said processors.

28. The computer-readable memory of claim 27, wherein said process controller allocates each of said threads to one of said processors.

29. The computer-readable memory of claim 28, wherein said process controller allocates some of said threads to more than one of said processors.

* * * * *